(12) United States Patent
Chapman (10) Patent No.: US 11,867,222 B2
(45) Date of Patent: Jan. 9, 2024

(54) HYBRID WASHER

(71) Applicant: John Eric Chapman, Gray, TN (US)

(72) Inventor: John Eric Chapman, Gray, TN (US)

( * ) Notice: Subject to any disclaimer, the term of this patent is extended or adjusted under 35 U.S.C. 154(b) by 441 days.

(21) Appl. No.: 16/973,802

(22) PCT Filed: Jun. 10, 2019

(86) PCT No.: PCT/US2019/036249
§ 371 (c)(1),
(2) Date: Dec. 10, 2020

(87) PCT Pub. No.: WO2019/241097
PCT Pub. Date: Dec. 19, 2019

(65) Prior Publication Data
US 2021/0262515 A1 Aug. 26, 2021

Related U.S. Application Data

(60) Provisional application No. 62/683,395, filed on Jun. 11, 2018.

(51) Int. Cl.
*F16B 43/00* (2006.01)
*F16B 39/24* (2006.01)

(52) U.S. Cl.
CPC ............ *F16B 43/009* (2013.01); *F16B 39/24* (2013.01); *F16B 43/00* (2013.01)

(58) Field of Classification Search
CPC .......... F16B 39/10; F16B 39/12; F16B 39/24; F16B 39/282; F16B 39/32; F16B 43/00; F16B 43/009; F16B 43/001
USPC ....... 411/132, 136, 138, 143, 145, 147, 149, 411/160, 531, 534, 368–369, 411/371.1–371.2, 542
See application file for complete search history.

(56) References Cited

U.S. PATENT DOCUMENTS

| D32,218 S | 2/1900 | Dougherty | |
| 1,066,761 A * | 7/1913 | Semon et al. | ......... F16B 39/24 |
| | | | 411/153 |
| 2,034,494 A | 3/1936 | Albert et al. | |
| 3,002,544 A * | 10/1961 | Buechting | ............... F16B 39/24 |
| | | | 411/157 |
| 3,241,589 A | 3/1966 | Enders | |

(Continued)

FOREIGN PATENT DOCUMENTS

KR 101658343 B1 9/2016

OTHER PUBLICATIONS

International Search Report and Written Opinion dated Sep. 3, 2019, issued in PCT Patent Application No. PCT/US2019/036249, 9 pages.

*Primary Examiner* — Roberta S Delisle
(74) *Attorney, Agent, or Firm* — Thomas M. Joseph, Esq.

(57) ABSTRACT

A hybrid washer has an essentially disk-shaped body having an outer ring, an inner ring, and a bore extending through the inner ring. The outer ring has an engagement surface having a plurality of wedges with each wedge having a raised edge that extends radially and perpendicularly from a longitudinal axis projecting through the bore. The inner ring has a pair of spaced-apart essentially flat surfaces in overlying relation with one another. The wedges form a plurality of crests contoured to frictionally engage a mating surface from a locking washer to fix the locking washer against the hybrid washer.

16 Claims, 4 Drawing Sheets

(56) References Cited

U.S. PATENT DOCUMENTS

| | | | | |
|---|---|---|---|---|
| 3,329,190 | A | * | 7/1967 | Oldenkott ............... F16B 39/24 |
| | | | | 411/149 |
| 3,438,416 | A | * | 4/1969 | Thurston ................. F16B 39/24 |
| | | | | 411/959 |
| D263,792 | S | | 4/1982 | Frieberg |
| D268,566 | S | | 4/1983 | Frieberg |
| D269,852 | S | | 7/1983 | Frieberg |
| D273,562 | S | | 4/1984 | Frieberg |
| D276,310 | S | | 11/1984 | Frieberg |
| 4,708,555 | A | * | 11/1987 | Terry ...................... F16B 39/24 |
| | | | | 411/149 |
| 5,626,449 | A | * | 5/1997 | McKinlay ............. F16B 39/282 |
| | | | | 411/533 |
| 5,659,876 | A | * | 8/1997 | Mizuta ................... B22F 3/101 |
| | | | | 470/42 |
| D483,660 | S | | 12/2003 | Cheng |
| 9,011,060 | B2 | | 4/2015 | Hyatt |
| 2002/0187065 | A1 | | 12/2002 | Amaya et al. |
| 2004/0112172 | A1 | * | 6/2004 | Shimizu ................. F16C 33/12 |
| | | | | 75/751 |
| 2005/0034559 | A1 | | 2/2005 | Lindenau et al. |
| 2013/0170922 | A1 | | 7/2013 | Persson |
| 2014/0037399 | A1 | * | 2/2014 | Hyatt ..................... F16B 43/009 |
| | | | | 470/42 |
| 2014/0140786 | A1 | | 5/2014 | McKinlay |
| 2014/0377032 | A1 | * | 12/2014 | Delcher ................. F16B 39/28 |
| | | | | 411/149 |
| 2016/0003287 | A1 | * | 1/2016 | Andersson ............ F16B 39/282 |
| | | | | 411/533 |
| 2017/0292558 | A1 | | 10/2017 | Hess et al. |
| 2018/0023614 | A1 | | 1/2018 | Andersson |

\* cited by examiner

HYBRID WASHER

CROSS REFERENCE TO RELATED APPLICATIONS

The present application is a U.S. national stage application of PCT International Application No. PCT/US2019/036249, filed Jun. 10, 2019, and published as PCT Publication WO/2019/241097 on Dec. 19, 2019, which claims priority to U.S. Patent Application No. 62/683,395, filed on Jun. 11, 2018. The disclosures of all the foregoing applications are hereby incorporated by reference in their entirety into the present application.

TECHNICAL FIELD

The subject disclosure is directed to new and improved hybrid washer for use in a fastening system. The hybrid washer includes an inner ring that has the configuration of a typical conventional washer and an outer ring that has the configuration of a locking washer with an engagement surface. The hybrid washer can be made through conventional methods, including conventional metal fabrication methods, or through powder metallurgy.

BACKGROUND ART

Conventional washers are disc shaped objects that include a pair of essentially parallel, flat surfaces with a central hole for a screw shank. The essentially flat characteristic of the parallel surfaces does not facilitate the engagement of one washer to another washer for locking purposes. The conventional washers can be manufactured from a strip blank that is fed to pass several forming or punching stations. The punching stations can utilize various upper and lower tools. In some arrangements, the pattern of teeth can be formed on and can cover, substantially, an upper surface. A pattern of cams can formed on and can cover, substantially, the lower surface of the washer.

These conventional washer fabrication processes have several disadvantages and problems. For example, undesired displacements can occur between the stations during feeding in the die arrangement to cause the formation of defective washers. In some instances, the total amount of blank material can be quite high. Furthermore, there can be restrictions related to the cam and teeth cover on each side of the washers, which decreases the possibility of forming load bearing surfaces. Also, the outer periphery can be punched out and can receive a sharp edge, which causes problems in the further processing of the washer.

Another type of washer is known as a locking washer. Such washers can be used in a locking system in which the washers are arranged in a pair with cam pattern sides facing and engaging each other. The main cam surface inclination can be larger than the pitch of the threads to cause a positive and efficient locking of a fastening element.

One particular type of locking washer arrangement involves a locking washer having teeth on one side and cams on the other side. The teeth can engage with a surface of a screw head, nut or an element to be attached. One possible shape is a leaning pyramidal shape. The teeth can extend, radially, on the locking washer surface. The other side of the known lock washers can have a cam pattern.

In some applications, locking washers are preferred over conventional washers. However, locking washers can have certain disadvantages, particularly involving excessive wear. For these reasons, there is a need for an improved washer.

DISCLOSURE OF INVENTION

In various implementations, a hybrid washer has an essentially disk-shaped body having an outer ring, an inner ring, and a bore extending through the inner ring. The outer ring has an engagement surface having a plurality of wedges with each wedge having a raised edge that extends radially and perpendicularly from a longitudinal axis projecting through the bore. The inner ring has a pair of spaced-apart essentially flat surfaces in overlying relation with one another. The inner ring is essentially flat from the bore to the outer ring. The wedges form a plurality of crests contoured to frictionally engage a mating surface from a locking washer to fix the locking washer against the hybrid washer.

MODES FOR CARRYING OUT THE INVENTION

The subject disclosure is directed to new and improved hybrid washer for use in a fastening system. The hybrid washer includes an inner ring that has the configuration of a typical conventional washer and an outer ring that has the configuration of a locking washer with an engagement surface. The hybrid washer can be made through conventional methods, including conventional metal fabrication methods, or through powder metallurgy.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

The disclosure relates to a hybrid washer that can be used within a fastening system. The hybrid washer has all of the advantages of a conventional washer and a locking washer in a single washer. This can eliminate the need to keep two different types of washers for different applications within various types of fastening systems. Further, the hybrid washer can be useful in fastening systems within high vibration environments.

Another advantage of the disclosed subject matter is that the hybrid washer can be made through powder metallurgy processes. These processes can be more efficient than conventional washer fabrication methods because they can use less material and can be made from metal powders that use recycled materials. The use of powder metallurgy processes can allow the hybrid washer to be made from a wider variety of metals and metal alloys, including metals and metal alloys that cannot be fabricated into washers through conventional processes.

Figure 1:
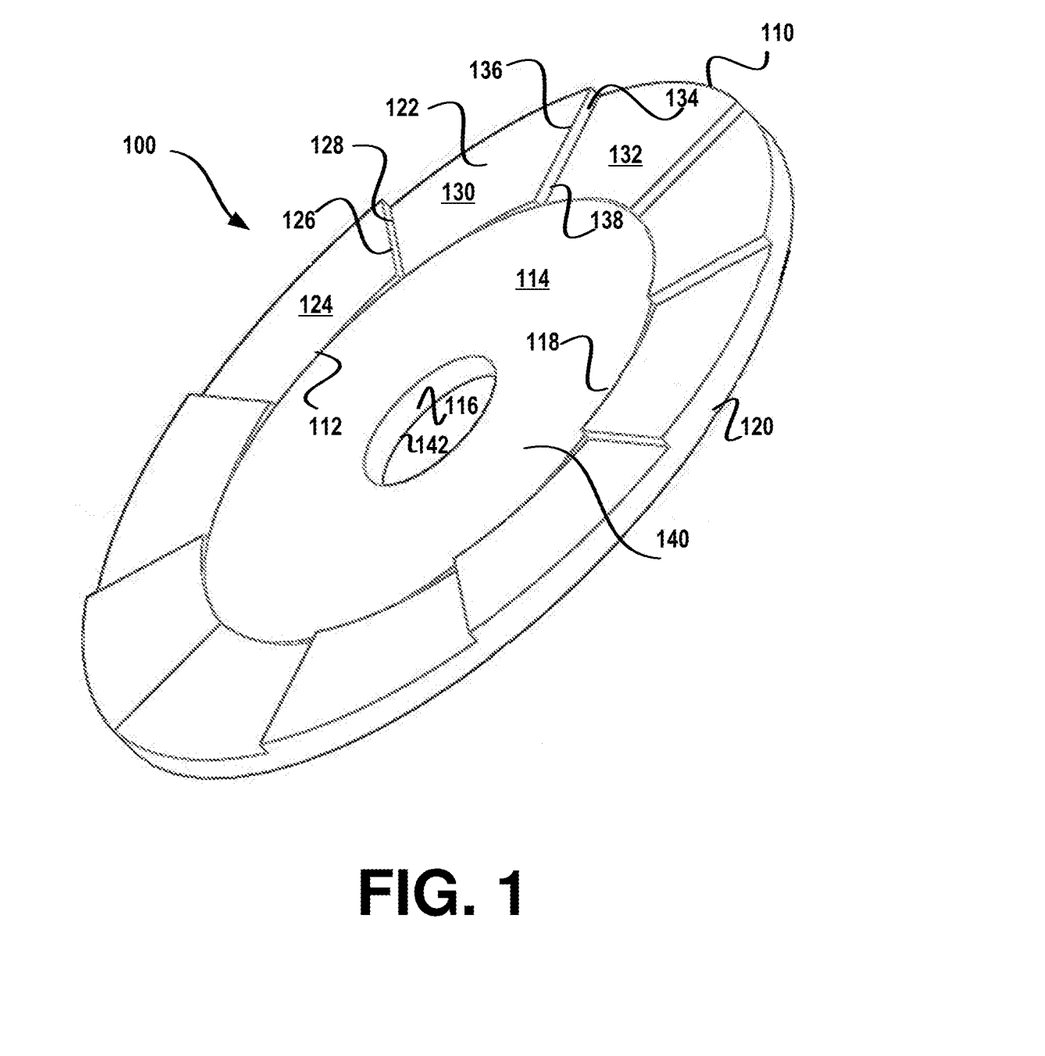
FIG. 1 is a perspective view of a hybrid washer in accordance with this disclosure.

Referring to FIG. 1, a hybrid washer, generally designated by the numeral 100, in accordance with this disclosure is shown. The hybrid washer 100 has an essentially disk-shaped body 110 with an outer ring 112, an inner ring 114, and a bore 116 extending through the inner ring 114. The outer ring 112 can perform the functions of a locking washer. The inner ring 114 can perform the functions of a conventional washer.

The outer ring 112 is bound by a contoured outer edge 118 and a contoured inner edge 120. The contoured outer edge 118 represents the outer surface of the hybrid washer 110 and forms an outer rim for the hybrid washer 110. The contoured inner edge 120 represents a boundary between the outer ring 112 and the inner ring 114. The inner ring 114 is bound on the opposite side by the bore 116, which forms an inner rim for the hybrid washer 110.

The outer ring 112 has an engagement surface 122 that functions as a locking washer engagement surface. The engagement surface 122 includes a plurality of wedges 124. Each wedge 124 has a raised edge 126 and lowered edge 128. The wedges 124 are contoured to form a plurality of crests and troughs around the contoured outer edge 118 of the outer ring 112. The crests and troughs can enhance the ability of the outer ring 112 to engage other surfaces, frictionally.

The wedges 124 abut one another to form a radial pattern on the engagement surface 122. Each raised edge 126 and lowered edge 128 extends radially and perpendicularly from a longitudinal axis, generally identified as D in FIGS. 2A-2D, projecting through the bore 116.

One exemplary wedge 130 is connected to an abutting wedge 132 by a face 134 that extends perpendicularly from the engagement surface 122. The face 134 is bound by the raised edge 136 on the wedge 130, the lowered edge 138 on the wedge 132, the contoured outer edge 118, and the contoured inner edge 120.

The inner ring 114 has a pair of essentially flat surfaces 140, 142 on opposite sides of the hybrid washer disc-shaped body 110. The essentially flat surfaces 140, 142 provide the inner ring 114 with the ability to function as a conventional washer.

The outer ring 112 and the inner ring 114 can be made from the same material or different materials. In some embodiments, the outer ring 112 and the inner ring 114 are unitary or integral and/or made from the same mass of material.

The outer ring 112 and the inner ring 114 can be made from can be made from any suitable material through any suitable manufacturing method. Suitable materials include flexible, semi-flexible, rigid, or semi-rigid materials. Suitable materials also include metals, ceramics, plastics, and composites. Specifically, suitable materials can include metals.

The metal is selected from the group consisting of carbon steel, spring steel, stainless steel, copper, brass, aluminum, titanium, iron, bronze, zinc, silicon bronze, Inconel, Monel, and Hastelloy.

Suitable manufacturing or fabrication methods generally fall into two categories. The first category of processes include the traditional forging and/or stamping processes in which the hybrid washer is formed from a square piece of wrought steel.

The second category of processes includes powder metallurgy processes, such as powder forging, hot isostatic pressing, metal injection molding, electric current assisted sintering, and additive manufacturing techniques. In such processes, powder metal can be stamped into a blank and put into an oven, so that the particles can be sintered together.

The powder metallurgy processes can be performed efficiently by using powder that contain a significant amount of recycled metal contents and by producing less waste material through the production of net shape or near-net shape products.

Referring now to FIGS. 2A-2D with continuing reference to the foregoing figures, various embodiments of a fastening system, generally designated by the numerals 200A-200D, are shown. The embodiments of the fastening systems 200A-200D include hybrid washers 210A-21.0D that have the ability to function as either a conventional washer or a locking washer. The hybrid washers 210A-210D are essentially identical to the hybrid washer 100 shown in FIG. 1.

The fastening systems 200A-200D include the hybrid washers 210A-210D, a shank member 212, a nut 214, and a bearing element 216. The shank member 212 connects the nut 214 to the bearing element 216. The nut 214 is positioned at one end 218 of the shank member 212. The bearing element 216 includes a hole 220 that receives the other end 222 of the shank member 212. In these exemplary embodiments, the shank member 212 is threaded and the bearing element hole 220 is configured to receive the threaded shank member 212.

Figure 2A:
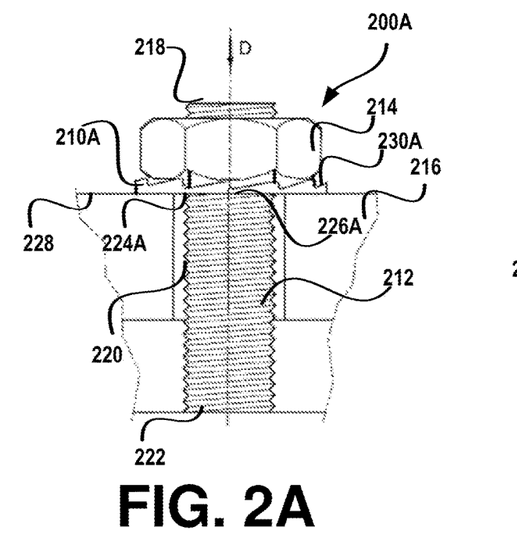
FIG. 2A is a fragmentary side elevation view in cross section of a fastening system in accordance with this disclosure.

Referring to FIG. 2A, an embodiment of the fastening system 200A is shown in which the hybrid washer 210A functions like a conventional washer between the nut 214 and the bearing element 216. The shank member 212 inserts through a bore 224A in the hybrid washer 210A. The bore 224A is essentially identical to the bore 116 shown in FIG. 1.

In this exemplary embodiment, a bottom surface 226A of the hybrid washer 210A abuts an upper surface 228 of the bearing element 216. The hybrid washer bottom surface 226A is an essentially flat surface that is essentially identical to the flat surface 142 shown in FIG. 1.

Unlike known fastening system that include a conventional washer, the fastening system 200A can be configured to have an engagement surface 230A frictionally engaging the nut 214 to provide an additional locking capability within the fastening system 200A. The frictional engagement of the engagement surface 230A against the nut 214 can lock or fix the shank member 212 into place between the nut 214 and the bearing element 216. The engagement surface 230A can be essentially identical to the engagement surface 122 shown in FIG. 1.

Figure 2B:
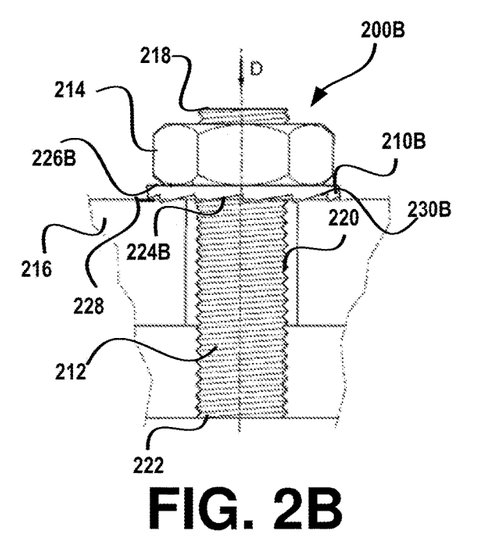
FIG. 2B is a fragmentary side elevation view in cross section of another embodiment of a fastening system in accordance with this disclosure.

Referring to FIG. 2B, another embodiment of the fastening system 200B is shown in which the hybrid washer 210B functions like a locking washer between the nut 214 and the bearing element 216. The shank member 212 inserts through a bore 224B in the hybrid washer 210B. The bore 224B is essentially identical to the bore 116 shown in FIG. 1.

In this exemplary embodiment, the hybrid washer 210B is positioned in an upside down configuration in which an essentially flat hybrid washer bottom surface 226B engages the nut 214. The upper surface 228 of the bearing element 216 abuts an engagement surface 230B for the hybrid washer 210B to lock or to fix the shank member 212 in place.

The engagement surface 230B of the hybrid washer 210B can deform the upper surface 228 either permanently or temporarily when the hybrid washer 210B is made from a material that is harder than the material for which the bearing element 216 is made. The configuration is particularly useful when the bearing element 216 is made from wood or plastic and the hybrid washer 210B is made from a metal that is harder than wood or plastic.

Figure 2C:
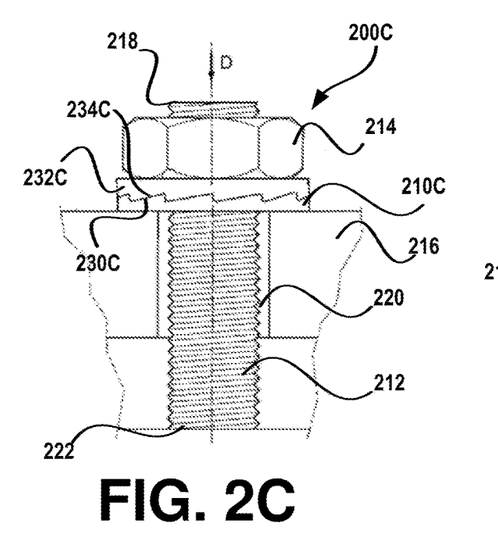
FIG. 2C is a fragmentary side elevation view in cross section of another embodiment of a fastening system in accordance with this disclosure.

Referring to FIG. 2C, another embodiment of the fastening system 200C is shown. The fastening system 200C is particularly adapted for applications in which there is a significant amount of vibration. In this exemplary embodiment, a hybrid washer 210C and a locking washer 232C are positioned between the nut 214 and the bearing element 216. The shank member 212 inserts through both the hybrid washer 210C and the locking washer 232C.

The hybrid washer 210C is with its engagement surface 230C facing the nut 214 and a mating surface 234C on the locking washer 232C facing the bearing element 216. The engagement surface 230C abuts the mating surface 234C, so that the surfaces are frictionally engaged.

The engagement surface 230C and the mating surface 234C can be contoured with a plurality of crests and troughs in the same manner in which the engagement surface 122 shown in FIG. 1 is contoured. In some embodiments, the mating surface 234C is contoured to form a plurality of crests for inserting into troughs on the engagement surface 230C. Similarly, the mating surface 234C can be contoured to form a plurality of troughs for receiving crests on the engagement surface 230C to lock the hybrid washer 210C against the locking washer 232C. In such embodiments, the engagement surface 230C and the mating surface 234C are interlocking, so that the hybrid washer 210C does not slip against the locking washer 232C, particularly when the environment includes a significant amount of vibration.

It should be understood that fastening system 200C can be configured with the hybrid washer 210C and the locking washer 232C in opposite positions. In such embodiments, the hybrid washer 210C abuts the nut 214 and the locking washer 232C abuts the bearing element 216. The engagement surface 230C abuts and frictionally engages the mating surface 234C.

Figure 2D:
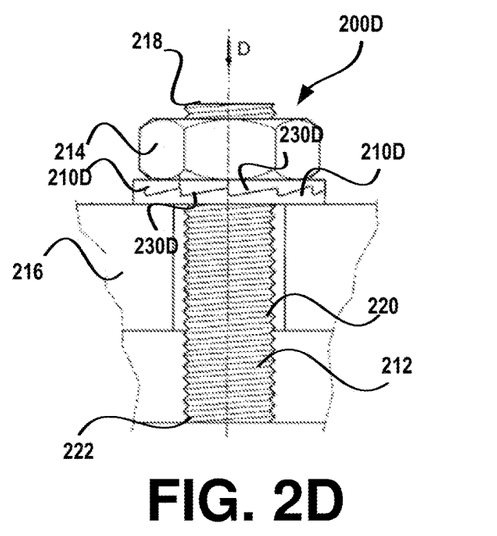
FIG. 2D is a fragmentary side elevation view in cross section of another embodiment of a fastening system in accordance with this disclosure.

Referring to FIG. 2D, another embodiment of the fastening system 200D is shown. Like the embodiment shown in FIG. 2C, the fastening system 200D is particularly adapted for applications in which there is a significant amount of vibration. Unlike the embodiment shown in FIG. 2C, the fastening system 200D includes two identical hybrid washers 210D positioned with the engagement surfaces 230D facing one another in abutment and in frictional engagement.

Figure 3:
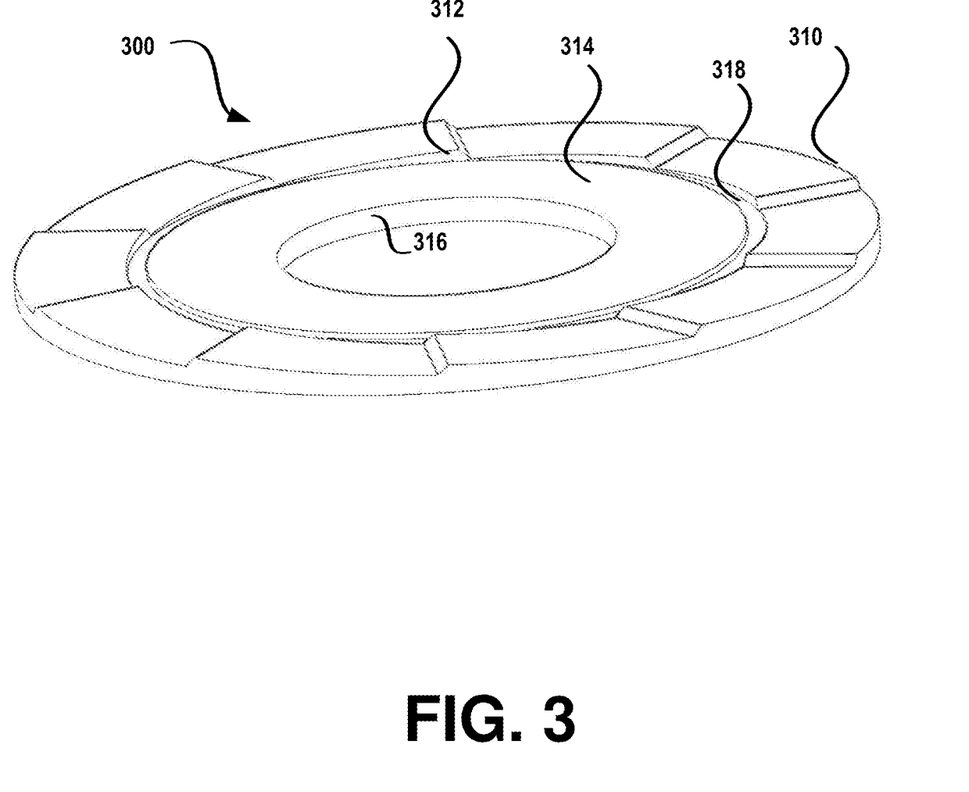
FIG. 3 illustrates an embodiment of an exemplary process in accordance with the described subject matter.

Referring to FIG. 3, another embodiment of a hybrid washer, generally designated by the numeral 300, in accordance with this disclosure is shown. Like the hybrid washer 100 shown in FIG. 1, the hybrid washer 300 has an essentially disk-shaped body 310 with an outer ring 312, an inner ring 314, and a bore 316 extending through the inner ring 314. The outer ring 312 can perform the functions of a locking washer. The inner ring 314 can perform the functions of a conventional washer.

Unlike the embodiment shown in FIG. 1, the hybrid washer 300 includes a recess 318 separating the outer ring 312 from the inner ring 314. In this exemplary embodiment, the recess 318 is essentially circular and is positioned between the outer ring 312 and the inner ring 314. The outer ring 312, the inner ring 314, the bore 316, and the recess 318 are essentially concentric with one another. The recess 318 allows for easier tooling.

Figure 4:
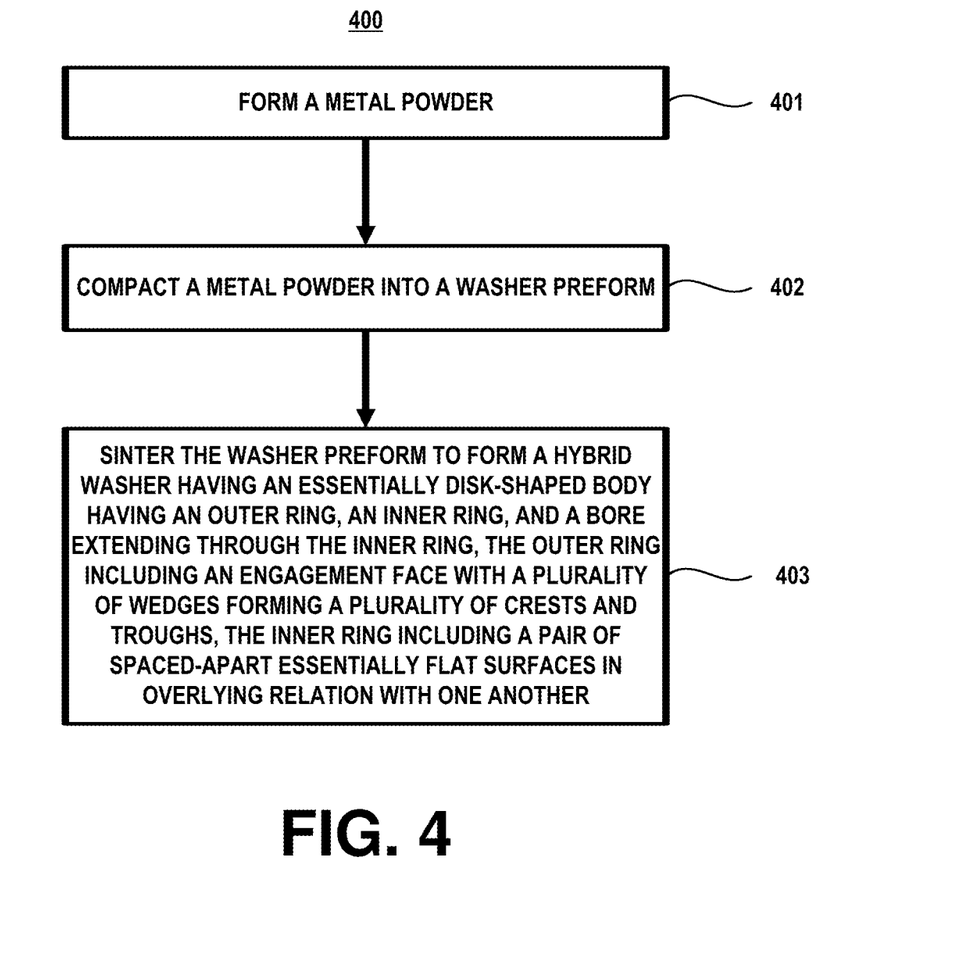
FIG. 4 illustrates a process in accordance with this disclosure.

Referring to FIG. 4 with continuing reference to the foregoing figures, a method 400 for making a hybrid washer in accordance with the described subject matter is shown. In this exemplary embodiment, the hybrid washer is essentially identical to the hybrid washer 100 shown in FIG. 1 and the hybrid washers 210A-210D shown in FIGS. 2A-2D.

At 401, a metal powder is formed. In this exemplary embodiment, the metal powder can be formed of multiple metals to facilitate the formation of a hybrid washer that is formed from a metal alloy.

At 402, a metal powder is compacted into a washer preform. In this exemplary embodiment, the compacting step can be performed through any conventional or unconventional powder metallurgy compacting step. In some embodiments, Step 402 is performed in a flexible mold.

At 403, the washer preform can be sintered to form a hybrid washer having an essentially disk-shaped body having an outer ring, an inner ring, and a bore extending through the inner ring, the outer ring including an engagement surface with a plurality of wedges forming a plurality of crests and troughs, the inner ring including a pair of spaced-apart essentially flat surfaces in overlying relation with one another.

SUPPORTED FEATURES AND EMBODIMENTS

The detailed description provided above in connection with the appended drawings explicitly describes and supports various features of a hybrid washer. By way of illustration and not limitation, supported embodiments include an apparatus comprising: a hybrid washer having an essentially disk-shaped body having an outer ring, an inner ring, and a bore extending through the inner ring, the outer ring having an engagement surface having a plurality of wedges with each wedge having a raised edge that extends radially and perpendicularly from a longitudinal axis projecting through the bore, and the inner ring includes a pair of spaced-apart essentially flat surfaces in overlying relation with one another, wherein the wedges form a plurality of crests contoured to frictionally engage a mating surface from a locking washer to fix the locking washer against the hybrid washer.

Supported embodiments include the foregoing apparatus, wherein the locking washer mating surface includes a plurality of troughs and the hybrid washer outer ring engagement surface crests are contoured to fit into the troughs.

Supported embodiments include any of the foregoing apparatus, wherein the hybrid washer includes metal.

Supported embodiments include any of the foregoing apparatus, wherein the metal is selected from the group consisting of carbon steel, spring steel, stainless steel, copper, brass, aluminum, titanium, iron, bronze, zinc, silicon bronze, Inconel, Monel, and Hastelloy.

Supported embodiments include any of the foregoing apparatus, wherein the metal is formed through a powder metallurgy process.

Supported embodiments include any of the foregoing apparatus, further comprising a recess separating the outer ring from the inner ring.

Supported embodiments include any of the foregoing apparatus, wherein the recess is essentially circular and the outer ring, the inner ring, the bore, and the recess are essentially concentric with one another.

Supported embodiments include a system, a method and/or means for implementing any of the foregoing apparatus or portions thereof.

Supported embodiments include a fastening system comprising: a shank member, a nut positioned at one end of the shank member, a bearing element receiving the other end of the shank member, and a hybrid washer having an essentially disk-shaped body having an outer ring, an inner ring, and a bore extending through the inner ring, the outer ring including an engagement surface with a plurality of wedges forming a plurality of crests and troughs, the inner ring including a pair of spaced-apart essentially flat surfaces in overlying relation with one another, wherein the shank member inserts through the hybrid washer inner ring bore.

Supported embodiments include the foregoing fastening system, further comprising: a locking washer having a mating surface for frictionally engaging the hybrid washer outer ring engagement surface to lock or to fix the shank member in place.

Supported embodiments include any of the foregoing fastening systems, wherein the hybrid washer is a first hybrid washer and the locking washer is a second hybrid washer having a mating surface with a plurality of wedges contoured to form a plurality of crests for inserting into the first hybrid washer engagement surface troughs and a plurality of troughs for receiving the first hybrid washer engagement surface crests to lock the first hybrid washer against the second hybrid washer.

Supported embodiments include any of the foregoing fastening systems, wherein the first hybrid washer is identical to the second hybrid washer.

Supported embodiments include any of the foregoing fastening systems, wherein the hybrid washer outer ring engagement surface frictionally engages the bearing element.

Supported embodiments include any of the foregoing fastening systems, wherein the hybrid washer outer ring engagement surface frictionally engages the nut.

Supported embodiments include any of the foregoing fastening systems, wherein the hybrid washer includes metal.

Supported embodiments include any of the foregoing fastening systems, wherein the metal is selected from the group consisting of carbon steel, spring steel, stainless steel, copper, brass, aluminum, titanium, iron, bronze, zinc, silicon bronze, Inconel, Monel, and Hastelloy.

Supported embodiments include any of the foregoing fastening systems, wherein the metal is formed through a powder metallurgy process.

Supported embodiments include any of the foregoing fastening systems, wherein the hybrid washer includes a recess separating the hybrid washer outer ring from the hybrid washer inner ring.

Supported embodiments include any of the foregoing fastening systems, wherein the recess is essentially circular and the hybrid washer outer ring, the hybrid washer inner ring, the hybrid washer bore, and the recess are essentially concentric with one another.

Supported embodiments include an apparatus, a method, and/or means for implementing any of the foregoing fastening systems or portions thereof.

Supported embodiments include a method of producing a hybrid washer, the method comprising: compacting a metal powder into a washer preform, and sintering the washer preform to form a hybrid washer having an essentially disk-shaped body having an outer ring, an inner ring, and a bore extending through the inner ring, the outer ring including an engagement surface with a plurality of wedges forming a plurality of crests and troughs, the inner ring including a pair of spaced-apart essentially flat surfaces in overlying relation with one another.

Supported embodiments include the foregoing method, further comprising: forming a metal powder.

Supported embodiments include any of the foregoing methods, further comprising: forming a metal powder having a plurality of metals to facilitate the formation of a metal alloy in the sintering step.

Supported embodiments include any of the foregoing methods, wherein each hybrid washer engagement surface trough is configured to receive a corresponding crest on a locking washer mating surface and each hybrid washer engagement surface crest is configured to insert into a corresponding trough on the locking washer mating surface.

Supported embodiments include any of the foregoing methods, wherein the locking washer is identical to the hybrid washer.

Supported embodiments include any of the foregoing methods, wherein the compacting step is performed in a flexible mold.

Supported embodiments include an apparatus, a system, and/or means for implementing any of the foregoing methods or portions thereof.

Supported embodiments can provide various attendant and/or technical advantages in terms of improved efficiency and/or savings with respect to providing a single washer than can function as both a conventional washer and as a locking washer. The washer can be particularly adapted for use in fastening systems in high vibration environments.

Supported embodiments include a hybrid washer that can be made through powder metallurgy processes to reduce or to eliminate waste material. Supported embodiments include a hybrid washer that can be made with metal powders that include a substantial amount of recycled material.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A hybrid washer for a fastening system having a shank member, a nut positioned at one end of the shank member, and a bearing element receiving the other end of the shank member, the hybrid washer comprising:
   an essentially disk-shaped body having an outer ring, an inner ring, and a bore extending through the inner ring, the outer ring including an engagement surface with a plurality of wedges forming a plurality of crests and troughs, the inner ring including a pair of spaced-apart essentially smooth flat surfaces in overlying relation with one another,
   wherein the inner ring is essentially a smooth flat surface from the bore to the outer ring;
   wherein the shank member inserts through the hybrid washer inner ring bore; and
   wherein the hybrid washer outer ring engagement surface frictionally engages the bearing element.

2. The hybrid washer of claim 1, wherein the hybrid washer includes metal.

3. The hybrid washer of claim 2, wherein the metal is selected from the group consisting of carbon steel, spring steel, stainless steel, copper, brass, aluminum, titanium, iron, bronze, zinc, silicon bronze, Inconel, Monel, and Hastelloy.

4. The hybrid washer of claim 2, wherein the metal is formed through a powder metallurgy process.

5. A fastening system comprising:
   a shank member,
   a nut positioned at one end of the shank member,
   a bearing element receiving the other end of the shank member, and
   a hybrid washer having an essentially disk-shaped body having an outer ring, an inner ring, and a bore extending through the inner ring, the outer ring including an engagement surface with a plurality of wedges forming a plurality of crests and troughs, the inner ring including a pair of spaced-apart essentially smooth flat surfaces in overlying relation with one another,
   wherein the inner ring is essentially a smooth flat surface from the bore to the outer ring;
   wherein the shank member inserts through the hybrid washer inner ring bore; and
   wherein the hybrid washer outer ring engagement surface frictionally engages the bearing element.

6. The fastening system of claim 5, further comprising:
   a locking washer having a mating surface for frictionally engaging the hybrid washer outer ring engagement surface to lock or to fix the shank member in place.

7. The fastening system of claim 6, wherein the hybrid washer is a first hybrid washer and the locking washer is a second hybrid washer having a mating surface with a plurality of wedges contoured to form a plurality of crests for inserting into the first hybrid washer engagement surface troughs and a plurality of troughs for receiving the first hybrid washer engagement surface crests to lock the first hybrid washer against the second hybrid washer.

8. The fastening system of claim 7, wherein the first hybrid washer is identical to the second hybrid washer.

9. The fastening system of claim 5, wherein the hybrid washer outer ring engagement surface frictionally engages at least one of the bearing element and the nut.

10. The fastening system of claim 5, wherein the hybrid washer includes metal.

11. The fastening system of claim 10, wherein the metal is formed through a powder metallurgy process and is selected from the group consisting of carbon steel, spring steel, stainless steel, copper, brass, aluminum, titanium, iron, bronze, zinc, silicon bronze, Inconel, Monel, and Hastelloy.

12. A method of producing a hybrid washer, the method comprising:
    compacting a metal powder into a washer preform, and
    sintering the washer preform to form a hybrid washer having an essentially disk-shaped body having an outer ring, an inner ring, and a bore extending through the inner ring, the outer ring including an engagement surface with a plurality of wedges forming a plurality of crests and troughs, the inner ring including a pair of spaced-apart essentially smooth flat surfaces extending from the bore to the outer ring in overlying relation with one another and the engagement surface being configured to frictionally engage a bearing element.

13. The method of claim 12, further comprising:
    forming a metal powder having a plurality of metals to facilitate the formation of a metal alloy in the sintering step.

14. The method of claim 12, wherein each hybrid washer engagement surface trough is configured to receive a corresponding crest on a locking washer mating surface and each hybrid washer engagement surface crest is configured to insert into a corresponding trough on the locking washer mating surface.

15. The method of claim 14, wherein the locking washer is identical to the hybrid washer.

16. The method of claim 12, wherein the compacting step is performed in a flexible mold.

* * * * *